3,255,182
17α-HALOETHYNYL-[3,2-c]PYRAZOLO ANDRO-
STENES AND INTERMEDIATES THEREFOR
Ralph F. Hirschmann, Scotch Plains, N.J., assignor to
Merck & Co., Inc., Rahway, N.J., a corporation of New
Jersey
No Drawing.   Filed Feb. 13, 1961, Ser. No. 88,657
8 Claims.   (Cl. 260—239.5)

This invention is concerned with novel steroid compounds and to processes of preparing the same. More particularly, it relates to novel [3,2-c]pyrazolo-4-androstene-17β-ols having the formula:

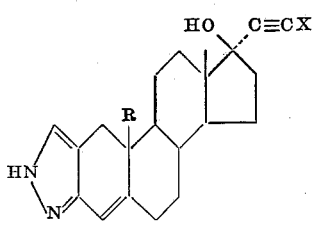

wherein X stands for hydrogen, halogen or the trifluoromethyl group and R represents hydrogen or methyl.

The compounds prepared by my invention possess useful therapeutic properties as orally and parenterally active progrestational agents and also as estrogenic agents.

In preparing my novel chemical compounds, the starting material utilized is a 17β-hydroxy-4-androstene-3-one having the formula:

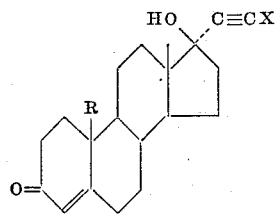

wherein X stands for hydrogen, halogen or the trifluoromethyl group and R represents hydrogen or methyl.

Upon treatment of the 17β-hydroxy-4-androstene-3-one with an alkyl formate and sodium hydride in an inert atmosphere there is formed the corresponding 2-hydroxymethylene derivative which has the following structure:

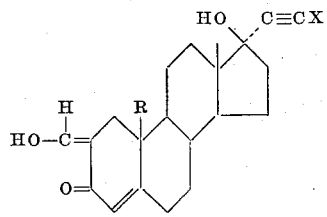

wherein X stands for hydrogen, halogen or the trifluoromethyl group and R represents hydrogen or methyl.

The 17β-hydroxy-2-hydroxymethylene-4-androstene-3-one is then reacted with hydrazine hydrate in an inert atmosphere to form the [3,2-c]pyrazolo compound having the formula:

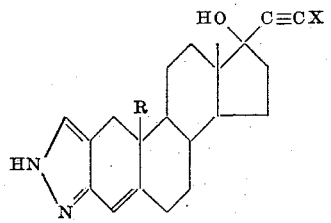

wherein X stands for hydrogen, halogen or the trifluoromethyl group and R represents hydrogen or methyl.

The above designated structure of the [3,2-c]pyrazolo compound is based upon an interpretation of the data according to the state of the art presently known to organic chemists. However, it is to be understood that no part of the specification will be materially defective if it should be later established that the structure of these compounds is isomeric to the structure shown above. The following structure is suggested as a possible isomeric modification:

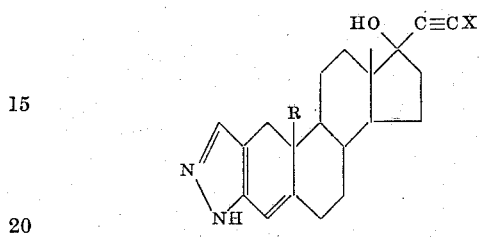

wherein X stands for hydrogen, halogen or the trifluoromethyl group and R represents hydrogen or methyl.

The following examples illustrate methods of carrying out the present invention but it is to be understood that these examples are given for purposes of illustration and not of limitation.

Example 1

To a suspension of 7 grams of 17α-ethynyl-17β-hydroxy-4-androstene-3-one in sodium ethylate, prepared by dissolving 1.05 grams of sodium in 17.5 ml. of absolute ethanol, is added 147 ml. of dry pyridine and 11.9 ml. of dry ethyl formate. The mixture is stirred under nitrogen for 2 days, then poured into ice water and acidified with glacial acetic acid. The reaction product separates as an oil which is chilled. The supernatant liquid is decanted and the product is taken up in ether. The ether extract is washed with 2.5 N hydrochloric acid, then 4 times with water and 5 times with sodium bicarbonate, and finally with 2% sodium hydroxide. The sodium hydroxide extracts are back-extracted with ether and then acidified with 2.5 N hydrochloric acid. The product is taken up with ether. The ether extract is washed with water and then taken to dryness to afford the 17α-ethynyl-17β-hydroxy-2-hydroxy-methylene-4 - androstene - 3 - one which is crystallized from ether, M.P. 194° C. The product shows infrared spectra characteristic of the A ring chromophore and acetylenic hydrogen and in alkaline methanol gives an absorption maximum at 242 mµ and 356 mµ in the ultraviolet.

To 165 mg. of 17α-ethynyl-17β-hydroxy-2-hydroxymethylene-4-androstene-3-one in 3.9 ml. of ethanol is added 0.212 ml. of a hydrazine hydrate reagent prepared by dissolving 1 part by volume of hydrazine hydrate and 2 parts of ethanol. The mixture is refluxed under nitrogen for 45 minutes. The volatiles are removed in vacuo and the residue is washed with water and dried to constant weight to give a solid which shows absorption maximum at 260 mµ in the ultraviolet (characteristic of the pyrazole A ring chromophore), and strong —C≡CH and NH peaks in the infrared. The crude product is recrystallized from methanol, filtered and washed with cold methanol to give 17α-ethynyl-[3,2-c]pyrazolo-4-androstene-17β-ol as a methanol solvate, M.P. 236–7° C. Analysis.—Calculated for $C_{23}H_{32}O_2N_2$: C, 74.96; H, 8.75; $OCH_3$, 8.4. Found: C, 74.67; H, 8.58; $OCH_3$, 8.1.

Example 2

A suspension of 610 mg. of 17α-ethynyl-17β-hydroxy-19-nor-4-androstene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 17α-ethynyl-17β-hydroxy-2-hydroxymethylene-19-nor-4-androstene-3-one, which is taken up in methylene chloride. The solution is filtered and evaporated to dryness. The product gives a strong ferric chloride test. Infrared spectra shows strong absorption at 3.02μ (—C≡CH) and at 6.06μ (A ring chromophore).

A 25 mg. aliquot of 17α-ethynyl-17β-hydroxy-2-hydroxymethylene-19-nor-4-androstene-3-one is dissolved in 0.6 ml. of ethanol. An 0.032 ml. aliquot of a reagent prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 17α - ethynyl - [3,2-c]pyrazolo-19-nor-4-androstene-17β-ol (19.5 mg.) which shows a strong —C≡CH peak in the infrared and a maximum at 2.60 mμ in the ultraviolet (characteristic of the pyrazole —A-ring chromophore).

*Example 3*

A suspension of 610 mg. of 17α-chloroethynyl-17β-hydroxy-4-androstene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addtion of 1 ml. of ethyl formate and 350 mg. of sodium hydride. The reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 17α-chloroethynyl-17β-hydroxy-2-hydroxymethylene-4-androstene-3-one, which is taken up in methylene chloride. The solution is filtered and evaporated to dryness.

A 25 mg. aliquot of 17α-chloroethynyl-17β-hydroxy-2-hydroxymethylene-4-androstene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 17α-chloroethynyl-[3,2-c]pyrazolo-4-androstene-17β-ol (19.5 mg.).

In accordance with the above procedures, but starting with the 17α-bromoethynyl- or the 17α-fluoroethynyl-17β - hydroxy - 4 - androstene-3-one in place of the 17α-chloroethynyl-17β-hydroxy-4-androstene-3-one, there is obtained the corresponding 17α-bromoethynyl- or the 17α-fluoroethynyl-[3,2-c]pyrazolo-4-androstene-17β-ol.

The starting materials can be prepared by the following procedures:

Twenty mg. of p-toluenesulfonyl chloride is added to 400 mg. of 17α-ethynyl-5-androstene-3β,17β-diol in 20 ml. of dihydropyran. The resulting mixture is allowed to stand at room temperature overnight. A 2.5 N NaOH solution is added until the mixture is slightly alkaline. Water is then added and the aqueous phase extracted with 4 portions of ether, each containing approximately 50 ml. The combined ether layers are washed with water, dried over Na₂SO₄ and evaporated under reduced pressure to give about 725 mg. of a noncrystalline product. The product dissolved in petroleum ether is chromatographed on 60 g. of neutral alumina and the chromatogram eluted with a 7:3 mixture of petroleum ether and ether to give 400 mg. of crystalline product, the 17α-ethynyl-5-androstene-3β,17β-diol-bis-tetrahydropyranyl ether,

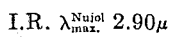

I.R. λ$_{max.}^{Nujol}$ 2.90μ

A solution of about 4 grams of 17α-ethynyl-5-androstene-3β,17β-diol-bis-tetrahydropyranyl ether in 75 ml. of t-butyl alcohol is prepared. About 1.1 equivalents of a 1.0 molar potassium t-butoxide is added and the resulting mixture refluxed for one hour, with stirring, and then cooled. About 1.84 ml. of t-butyl hypochlorite is then added in one portion and the reaction mixture is left stirring at room temperature overnight. About 100 ml. of water is added and the resulting aqueous mixture is extracted with four portions of ether, each containing approximately 200 ml. The combined layers are washed with water, dried over sodium sulfate, filtered and evaporated to dryness in vacuo. The residual material is dissolved in petroleum ether and chromatographed on 120 g. of alumina. Elution with petroleum ether gives about 3.10 grams (a 70% yield) of crystals of 17α-chloroethynyl - 5 - androstene-3β,17β-diol-bis-tetrahydropyranyl ether. The crude product shows infrared peaks at 4.4μ and 2.9μ.

A solution of about 3 g. of the 17α-chloroethynyl-5-androstene-3β,17β-diol-bis-tetrahydropyranyl ether in 125 ml. of methanol is prepared. To this solution is added 2.5 ml. of concentrated hydrochloric acid and the reaction mixture is stirred for about 1 hour at room temperature. The methanol is then removed by evaporation under reduced pressure until the product crystallizes. Approximately 100 ml. of water is then added and the resulting product is extracted with four portions of ether, each containing about 200 ml. The combined ether extract is washed with water, dried over sodium sulfate and evaporated to a crystalline residue. The residual crystalline material is recrystallized several times from ether to give about 1.58 g. of 17α-chloroethynyl-5-androstene-3β,17β-diol which has the following properties: M.P. 195° C.    *Analysis.*—Calculated for

C, 72.30; H, 8.38; Cl, 10.16. Found: C, 71.64; H, 8.63; Cl, 10.48.

One hundred mg. of 17α-chloroethynyl-5-androstene-3β,17β-diol is dissolved in 1.0 ml. of cyclohexanone and 10 ml. of benzene in a flask fitted with a magnetic stirrer and a reflux condenser. About 5 ml. of the benzene is distilled and a stream of dry nitrogen is passed through the system and maintained throughout the reaction time. Then 0.5 ml. of a 10% solution of aluminum isopropoxide in benzene is added and the reaction mixture is maintained at reflux temperature for 4 hours. The solution is cooled, 5 drops of water are added and the resultant aluminum hydroxide is filtered off. The filtrate is taken to dryness under reduced pressure. The material is dissolved in ether, filtered, and the filtrate concentrated to give about 37 mg. of crude 17α-chloroethynyl-4-androstene-17β-ol-3-one, M.P. 178–183° C. Recrystallization from ether gives about 25 mg. of the purified product, M.P. 182–184° C. Chromatography of all mother liquors on 3 g. of alumina and elution of the chromatogram with ether gives an additional 20 mg. of product, M.P. 181–184° C. Total yield 45 mg. The product has the following properties:

U.V. $\lambda_{max.}^{MeOH}$ 241 m$\mu$, $\epsilon$ 15,000. I.R. $\lambda_{max.}^{Nujol}$ 2.8, 4.43, 6.0, 6.18$\mu$

*Analysis.*—Calculated for $C_{21}H_{27}O_2Cl$: C, 72.73; H, 7.85; Cl, 10.22. Found: C, 73.41; H, 7.93; Cl, 10.81.

To a solution of 482 mg. of 17$\alpha$-ethynyl-5-androstene-3$\beta$,17$\beta$-diol-bis-tetrahydropyranyl ether in 10 ml. of tertiary-butyl alcohol, is added about 1.1 equivalents of a 1.0 molar potassium t-butoxide. The resulting mixture is refluxed for one hour, with stirring, and then cooled. 196 mg. of N-bromosuccinimide is then added and the reaction mixture is stirred at room temperature for about 18 hours. The entire reaction mixture is dissolved in water and then extracted with 3 portions of ether, each containing approximately 50 ml. The combined ether extracts are washed with three portions of a saturated solution of NaHCO$_3$, each portion containing approximately 25 ml., then with 3 portions of water, each containing about 25 ml. The ether layer is dried over sodium sulfate, filtered and evaporated to dryness. The oily residue is filtered through 20 g. of aluminum oxide to give 407 mg. of oily material which is dissolved in petroleum ether and chromatographed on 30 g. of acetone activated alkaline alumina. Elution with a 9:1 mixture of petroleum ether and ether yields 87 mg. of 17$\alpha$ - bromo-ethynyl-5-androstene-3$\beta$,17$\beta$-diol-bis-tetrahydropyranyl ether. An infrared spectrum of this material shows $\lambda$ max. 4.5$\mu$.

To a solution of 400 mg. of 17$\alpha$-bromoethynyl-5-androstene-3$\beta$,17$\beta$-diol-bis-tetrahydropyranyl ether in 40 ml. of methanol is added 0.8 ml. of concentrated HCl, and the reaction mixture is stirred for one hour at room temperature. The methanol is then removed under reduced pressure. Water is added and the resulting solution is extracted with 3 portions of ether, each portion containing approximately 75 ml. The combined ether extracts are washed three times with approximately 50 ml. of water, dried over sodium sulfate, filtered and evaporated to dryness. The residual material is crystallized to give 230 mg. of 17$\alpha$-bromoethynyl-5-androstene-3$\beta$,17$\beta$-diol which has the following properties: M.P. 214–215° C.

I.R. $\lambda_{max.}^{Nujol}$ 2.7, 2.89, 4.55$\mu$

*Analysis.*—Calculated for $C_{21}H_{29}O_2Br$: C, 64.10; H, 7.43; Br, 20.32. Found: C, 62.40; H, 7.65; Br, 20.50.

17$\alpha$-bromoethynyl-5-androstene-3$\beta$,17$\beta$-diol (195 mg.) is dissolved in 1.95 ml. of cyclohexanone and 20 ml. of benzene, using a flask fitted with a magnetic stirrer and a reflux condenser. After 3 ml. of benzene is distilled, a stream of dry nitrogen is passed through the system, and maintained throughout the entire reaction time. After cooling to room temperature, there is added 0.98 ml. of a 10% solution of aluminum isopropoxide in benzene, and the reaction mixture is refluxed for 3 hours and cooled to room temperature. Ten drops of water are added and the reaction mixture is filtered. The filtrate is taken to dryness. The residue is chromatographed on acetone activated acid-washed alumina and eluted with a mixture of seven parts ether to three parts petroleum ether to give 17$\alpha$-bromoethynyl-4-androstene-17$\beta$-ol-3-one, U.V. $\lambda_{max.}^{MeOH}$ 240$\mu$, 15,700, I.R. $\lambda_{max.}^{Nujol}$ 2.9, 4.51, 6.0, 6.2$\mu$ In accordance with the above procedures, but using a fluorinating agent, for example perchloryl fluoride, in place of N-bromosuccinimide, there is obtained the 17$\alpha$-fluoroethynyl-5-androstene - 3$\beta$,17$\beta$ - diol-bis-tetrahydropyranyl ether instead of 17$\alpha$-bromoethynyl-5-androstene-3$\beta$,17$\beta$-diol-bis-tetrahydropyranyl ether. The latter compound is then treated with concentrated hydrochloric acid to give 17$\alpha$-fluoroethynyl-4-androstene-17$\beta$-ol-3-one.

*Example 4*

A suspension of 610 mg. of 17$\alpha$-chloroethynyl-17$\beta$-hydroxy-19-nor-4-androstene-3-one in 50 ml. of dry bnezene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 17$\alpha$-chloroethynyl - 17$\beta$ - hydroxy-2-hydroxymethylene-19-nor-4-androstene-3-one, which is taken up in methylene chloride. The solution is filtered and evaporated to dryness.

A 25 mg. aliquot of 17$\alpha$-chloroethynyl-17$\beta$-hydroxy-2-hydroxymethylene-19-nor-4-androstene-3-one is dissolved in 0.6 ml. of ethanol. An 0.032 ml. aliquot of a reagent prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 17$\alpha$-chloroethynyl-[3,2-c]pyrazolo - 19 - nor - 4 - androstene-17$\beta$-ol.

In accordance with the above procedures, but starting with the 17$\alpha$-bromoethynyl- or the 17$\alpha$-fluoroethynyl-17$\beta$-hydroxy-19-nor-4-androstene-3-one in place of the 17$\alpha$-chloroethynyl - 17$\beta$ - hydroxy-19-nor-4-androstene-3-one there is obtained the corresponding 17$\alpha$-bromoethynyl- or 17$\alpha$-fluoroethynyl-[3,2-c]pyrazolo-19-nor - 4 - androstene-17$\beta$-ol.

The starting materials can be prepared by the following procedures: A solution consisting of 1.7 g. (1.32 cc.) of cis-1,2-dichloroethylene in 10 cc. of sodium dried ether is added over 0.5 hour at 0° C. to 3 cc. of a 1.4 N solution of methyl lithium (prepared by adding lithium to methyl iodide in dry ether solution under nitrogen at about 10° C.) in 25 cc. of sodium dried ether. The reaction mixture is stirred at room temperature under nitrogen for an additional 1½ hours, followed by the addition over a 15-minute period of 100 mg. of 3-methoxy-2,5(10)-androstadiene-17-one in 4 cc. of sodium dried ether. The mixture is left stirring at room temperature overnight, poured into ice water and extracted with ether. The ether extracts are washed with water, dried over sodium sulfate and concentrated in vacuo. The residue is chromatographed on 10 g. of basic alumina. The product is eluted with petroleum ether: ether 8:2. Crystallization from acid-free methanol affords 48 mg. of 17$\alpha$-chloroethynyl - 3-methoxy - 2,5(10)-androstadiene-17$\beta$-ol, M.P. 80–85° C.

I.R. $\lambda_{max.}^{Nujol}$ 2.80, 4.48, 6.02, 6.12$\mu$

In accordance with the above procedure, but using 1,2-dibromoethylene in place of 1,2-dichloroethylene, there is obtained the 17$\alpha$-bromoethynyl - 3-methoxy-2,5(10)-androstadiene-17$\beta$-ol.

In accordance with the above procedure, but using 1-chloro-2-fluoroethylene in place of 1,2-dichloroethylene, there is obtained a mixture of the 17$\alpha$-chloroethynyl- and the 17$\alpha$-fluoroethynyl - 3-methoxy-2,5(10)-androstadiene-17$\beta$-ol, which compounds are separated by chromatography.

A solution consisting of 10 mg. of 17$\alpha$-chloroethynyl- 3-methoxy-2,5(10)-androstadiene-17$\beta$-ol, 2 cc. of acetone and 2 mg. of p-toluenesulfonic acid is left standing at room temperature overnight. The reaction mixture is then poured into ice water and extracted with ether. The ether extract is washed with aqueous sodium bicarbonate solution, dried over sodium sulfate and concentrated in vacuo. Crystallization from ethyl acetate affords 17α-chloroethynyl-17β-hydroxy - 19-nor-4-androstene - 3-one, M.P. 185–190° C.

I.R. $\lambda_{max}^{Nujol}$ 2.95, 4.50, 6.10, 6.21μ

In accordance with the above procedure, but starting with the 17α-bromoethynyl- or the 17α-fluoroethynyl-3-methoxy-2,5(10)-androstadiene-17β-ol in place of the 17α-chloroethynyl - 3-methoxy - 2,5(10)-androstadiene-17β-ol there is obtained the corresponding 17α-bromoethynyl- or the 17α-fluoroethynyl-17β-hydroxy-19-nor-4-androstene-3-one.

*Example 5*

A suspension of 610 mg. of 17α-trifluoropropynyl-17β-hydroxy-4-androstene-3-one in 50 ml. of dry benzene is stirred in a nitrogen atmosphere with 1 ml. of ethyl formate 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 17α-trifluoropropynyl - 17β-hydroxy - 2-hydroxymethylene - 4-androstene-3-one, which is taken up in methylene chloride. The solution is filtered and evaporated to dryness. The product gives a strong ferric chloride test. Infrared spectra shows strong absorption at 6.06μ (A ring chromophore).

A 25 mg. aliquot of 17α-trifluoropropynyl-17β-hydroxy-2-hydroxymethylene - 19-nor-4-androstene - 3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 17α-trifluoropropynyl-[3,2-c]pyrazolo-4-androstene-17β-ol (19.5 mg.) which shows a maximum at about 260 mμ in the ultraviolet (characteristic of the pyrazole— A ring chromophore).

The 17α-trifluoropropynyl-17β-hydroxy-4-androstene-3-one used as starting material can be prepared by the following procedure:

To a solution of one gram of 17β-hydroxy-4-androstene-3-one, dissolved in 75 ml. of benzene is added 7.5 ml. of ethylene glycol and 50 g. of p-toluenesulfonic acid. The reaction mixture is heated at reflux with a water separator for 20 hours. The reaction is cooled and about 10 ml. of sodium bicarbonate solution is added. The reaction mixture is then extracted with 3 portions of ether, each portion containing about 100 ml. The combined extracts are washed with water, dried over sodium sulfate and evaporated to dryness to give 3-ethylenedioxy-5-androstene-17β-ol.

A solution of 400 mg. of 3-ethylenedioxy-5-androstene-17β-ol in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from a mixture of ethyl acetate and ether to give 3-ethylenedioxy-5-androstene-17-one.

A 50 cc. three-neck round bottom flask is fitted with a Dry-Ice condenser, a dropping funnel and a magnetic stirrer. After the addition of 210 mg. of magnesium, the entire system is swept with nitrogen and flame dried. Five cc. of dry ether is added to the magnesium and 1 cc. of ethyl bromide in 5 cc. of ether is added dropwise with stirring over 15 minutes. After all the magnesium has reacted, 5 cc. of trifluoropropyne (prepared by the reaction of propiolic acid with sulfur tetrafluoride) is distilled into the reaction mixture and the mixture is maintained under reflux for one hour, using a Dry-Ice-acetone condenser. The reaction is then allowed to warm to room temperature, the excess gaseous trifluoropropyne being distilled off. A solution of 500 mg. of 3-ethylenedioxy-5-androstene-17-one which is dried by azeotropic distillation from benzene, is added in 5 cc. of benzene and 5 cc. of dry ether. The reaction mixture is stirred for 16 hours at room temperature. Water is then added and the mixture extracted with ether. The organic extracts are washed with water until the washings are weakly basic, dried over sodium sulfate and concentrated in vacuo. The residue is chromatographed on 20 g. of basic alumina, by charging with petroleum ether and eluting with a mixture of 8 parts petroleum ether and 2 parts ether to give 410 mg. of 3-ethylenedioxy-17α-trifluoropropynyl-5-androstene-17β-ol.

To 150 mg. of the above product in 15 cu. of acetone is added 15 mg. of p-toluenesulfonic acid. This mixture is allowed to stand for 18 hours at room temperature, and is then poured into ice water and extracted with ether. The organic extracts are washed to neutrality with water, dried over sodium sulfate and concentrated in vacuo. The residue is chromatographed on 5 g. of acid-washed alumina by charging with benzene and eluting with 6 parts of a mixture of petroleum ether with 4 parts of ether. Recrystallization from a mixture of petroleum ether and ether affords 42 mg. of 17α-trifluoropropynyl-17β-hydroxy-4-androstene-3-one.

*Example 6*

A suspension of 610 mg. of 17α-trifluoropropynyl-17β-hydroxy-19-nor-4-androstene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives 17α-trifluoropropynyl-17β-hydroxy - 2 - hydroxymethylene - 19 - nor - 4 - androstene-3-one, whicvh is taken up in methylene chloride. The solution is filtered and evaporated to dryness.

A 25 mg. aliquot of 17α-trifluoropropynyl-17β-hydroxy - 2 - hydroxymethylene - 19 - nor - 4 - androstene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 17α-trifluoropropynyl[3,2-c]pyrazolo-19-nor-4-androstene-17β-ol.

The 17α - trifluoropropynyl - 17β - hydroxy - 19 - nor-4-androstene-3-one used as starting material can be prepared by the following procedure:

A 50 cc. three-neck round bottom flask is fitted with a Dry-Ice condenser, a dropping funnel and a magnetic stirrer. After the addition of 210 mg. of magnesium, the entire system is swept with nitrogen and flame dried. Five cc. of dry ether is added to the magnesium and 1 cc. of ethyl bromide in 5 cc. of ether is added dropwise with stirring over 15 minutes. After all the magnesium has reacted, 5 cc. of trifluoropropyne (prepared by the reaction of propiolic acid with sulfur tetrafluoride) is distilled into the reaction mixture and the mixture is maintained under reflux for one hour, using a Dry-Ice-acetone condenser. The reaction is then allowed to warm to room temperature, the excess gaseous trifluoro-propyne being distilled off. A solution of 500 mg. of 3-methoxy-2,5(10)-androstadiene-17-one which is dried by azeotropic distillation from benzene, is added in 5 cc. of benzene and 5 cc. of dry ether. The reaction mixture is stirred for 16 hours at room temperature. Water is then added and the mixture extracted with ether. The organic extracts are washed with water until the washings are weakly basic, dried over sodium sulfate and concentrated in vacuo. The residue is chromatographed on 20 g. of basic alumina, by charging with petroleum ether and eluting with a mixture of 8 parts petroleum ether and 2 parts ether to give 410 mg. of 17α-trifluoropropynyl-3-methoxy-2,5(10)-androstadiene-17β-ol.

To 150 mg. of the product obtained in 15 cc. of acetone is added 15 mg. of p-toluenesulfonic acid. This mixture is allowed to stand for 18 hours at room temperature, and is then poured into ice water and extracted with ether. The organic extracts are washed to neutrality with water, dried over sodium sulfate and concentrated in vacuo. The residue is chromatographed on 5 g. of acid-washed alumina by charging with benzene and eluting with 6 parts of a mixture of petroleum ether with 4 parts of ether. Recrystallization from a mixture of petroleum ether and ether affords 42 mg. of 17α-trifluoropropynyl - 17β - hydroxy - 19 - nor - 4 - androstene - 3-one, M.P. 128–132° C., I.R. $\lambda_{max.}^{Neat}$ 2.95, 4.45, 6.05, 6.20μ. U.V. $\lambda_{max.}^{MeOH}$ 238, 15,000;

$[\alpha]_D^{26°\ C.}$ —21.0, CHCl₃ c., 1.0.

Various changes and modifications may be made in carrying out the present invention without departing from the spirit and scope thereof. Insofar as these changes and modifications are within the purview of the annexed claims, and they are to be considered as part of our invention.

We claim:
1. 17α - haloethynyl - 17β - hydroxy - 2 - hydroxymethylene-4-androstene-3-one.
2. 17α - haloethynyl - [3,2 - c]pyrazolo - 4 - androstene-17β-ol.
3. 17α - haloethynyl - 17β - hydroxy - 2 - hydroxymethylene-19-nor-4-androstene-3-one.
4. 17α - haloethynyl - [3,2 - c]pyrazolo - 19 - nor - 4-androstene-17β-ol.
5. 17α - trifluoropropynyl - 17β - hydroxy - 2 - hydroxymethylene-4-androstene-3-one.
6. 17α - trifluoropropynyl-[3,2 - c]pyrazolo - 4 - androstene-17β-ol.
7. 17α - trifluoropropynyl - 17β - hydroxy - 2 - hydroxymethylene-19-nor-4-androstene-3-one.
8. 17α - trifluoropropynyl - [3,2 - c]pyrazolo - 19-nor-4-androstene-17β-ol.

References Cited by the Examiner
UNITED STATES PATENTS

| 2,908,693 | 10/1959 | Ringold et al. | 260—397.4 |
| 2,945,852 | 7/1960 | Bergstrom | 260—239.5 |

OTHER REFERENCES

Ringold et al.: J.A.C.S. 81, 427—431 (1959), publication.

LEWIS GOTTS, *Primary Examiner.*

LESLIE H. GASTON, MORRIS LIEBMAN, *Examiners.*

HENRY A. FRENCH, G. E. LANDE,
*Assistant Examiners.*